United States Patent [19]

Kadota et al.

[11] Patent Number: 4,832,665
[45] Date of Patent: May 23, 1989

[54] TENSIONER

[75] Inventors: Yasushi Kadota; Yoshikazu Nishida, both of Osaka, Japan

[73] Assignee: Koyo Seiko Co., Ltd., Osaka, Japan

[21] Appl. No.: 136,312

[22] Filed: Dec. 22, 1987

[30] Foreign Application Priority Data

Dec. 27, 1986 [JP] Japan .................................. 61-311249
May 30, 1987 [JP] Japan .................................. 62-137006

[51] Int. Cl.$^4$ ............................................. F16H 7/10
[52] U.S. Cl. .................................................. 474/112
[58] Field of Search ............... 474/101, 111, 112, 135; 74/570

[56] References Cited

U.S. PATENT DOCUMENTS 4,634,407  1/1987  Holtz .................................... 474/112
4,721,495  1/1988  Kan et al. ............................. 474/135

FOREIGN PATENT DOCUMENTS 2043548  6/1971  Fed. Rep. of Germany ...... 474/112

Primary Examiner—Thuy M. Bui
Attorney, Agent, or Firm—Armstrong, Nikaido, Marmelstein, Kubovcik & Murray

[57] ABSTRACT

A tensioner comprising a solid cylindrical fixed member to be fixedly attached to a stationary portion, a movable eccentric member in the form of a solid cylinder and eccentrically rotatably provided around the fixed member, an idler in the form of a hollow cylinder and rotatably provided around the movable eccentric member for contact with a wrapping connector driving member, and a spring provided between the stationary portion and the movable eccentric member for biasing the eccentric member in a direction to press the idler into contact with the wrapping connector driving member. A high-viscosity oil is provided in a clearance between the outer periphery of the fixed member and the inner periphery of the movable eccentric member.

4 Claims, 7 Drawing Sheets

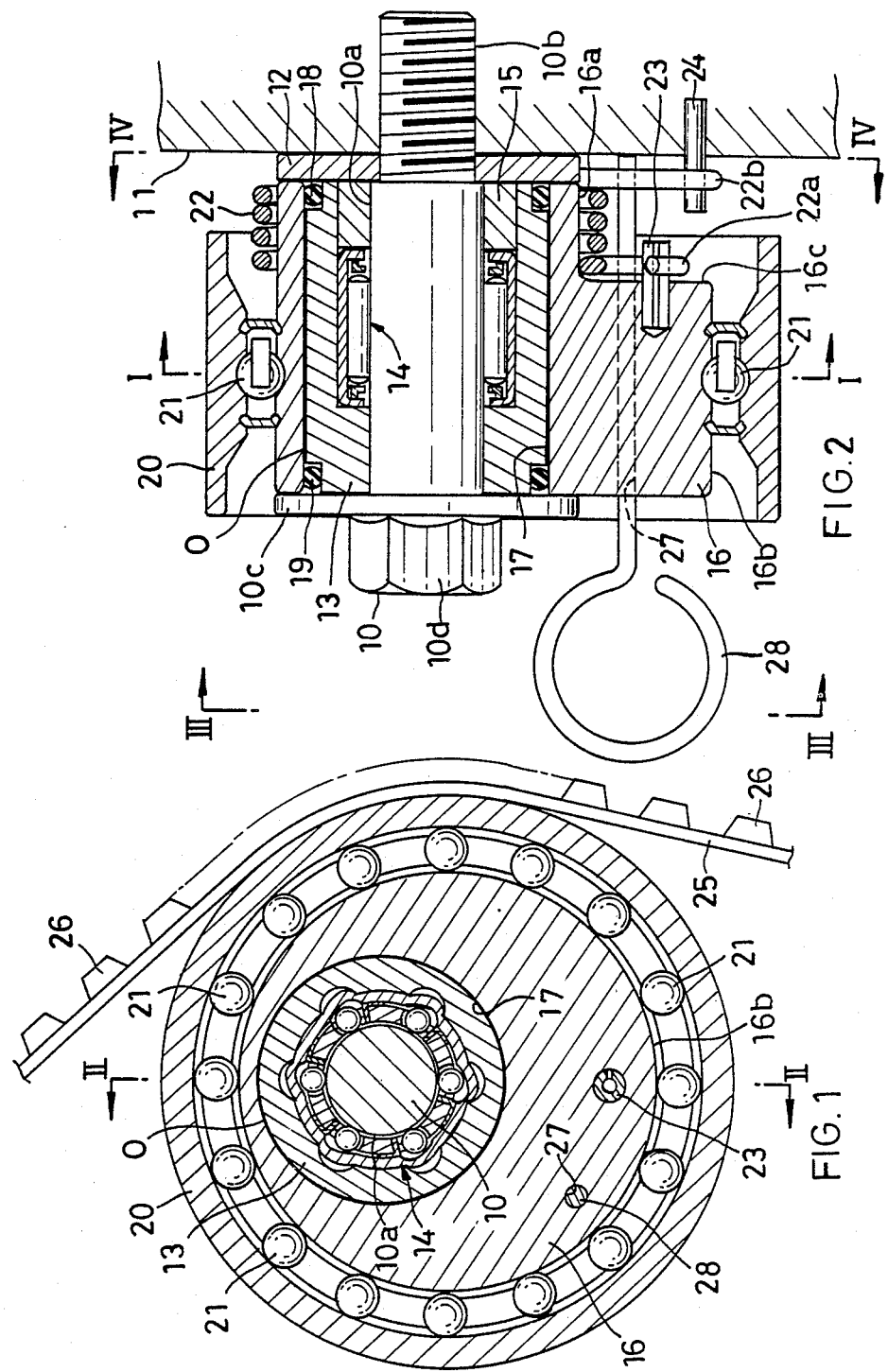

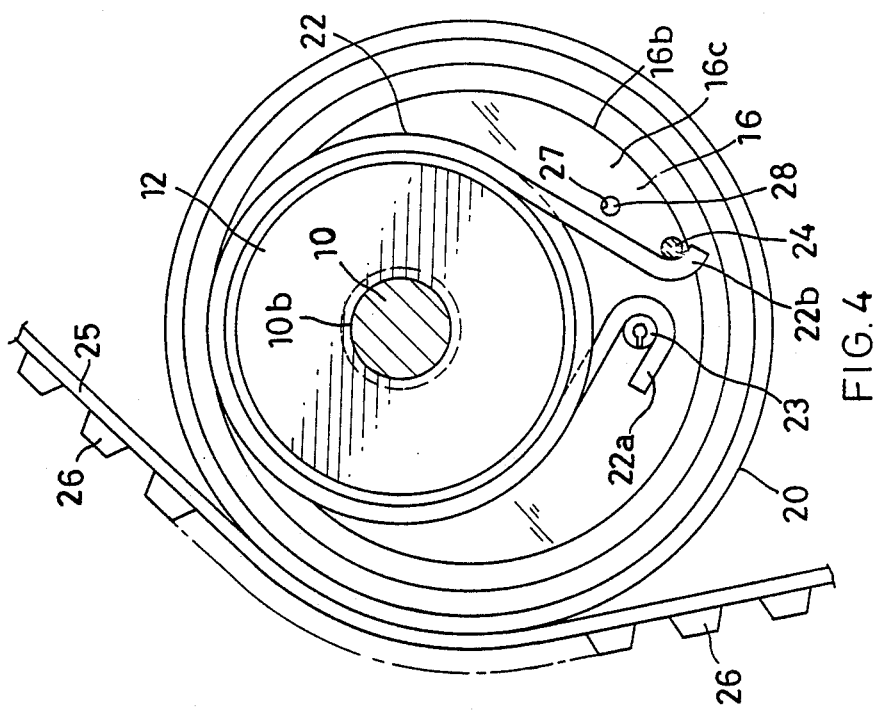
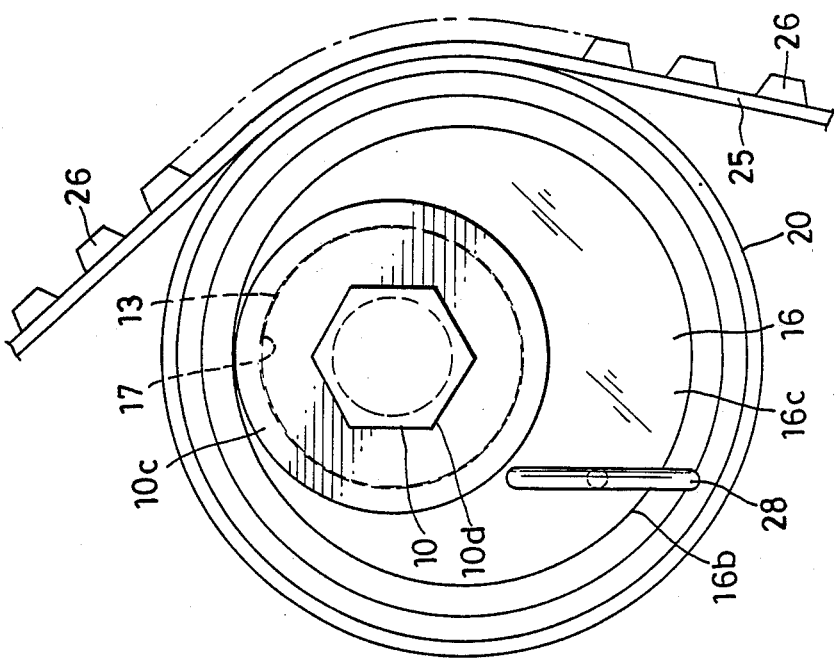

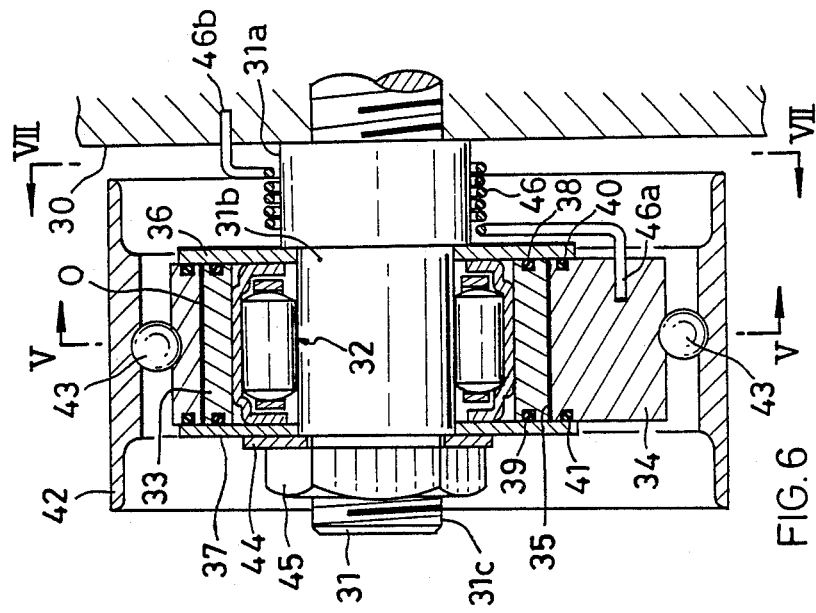
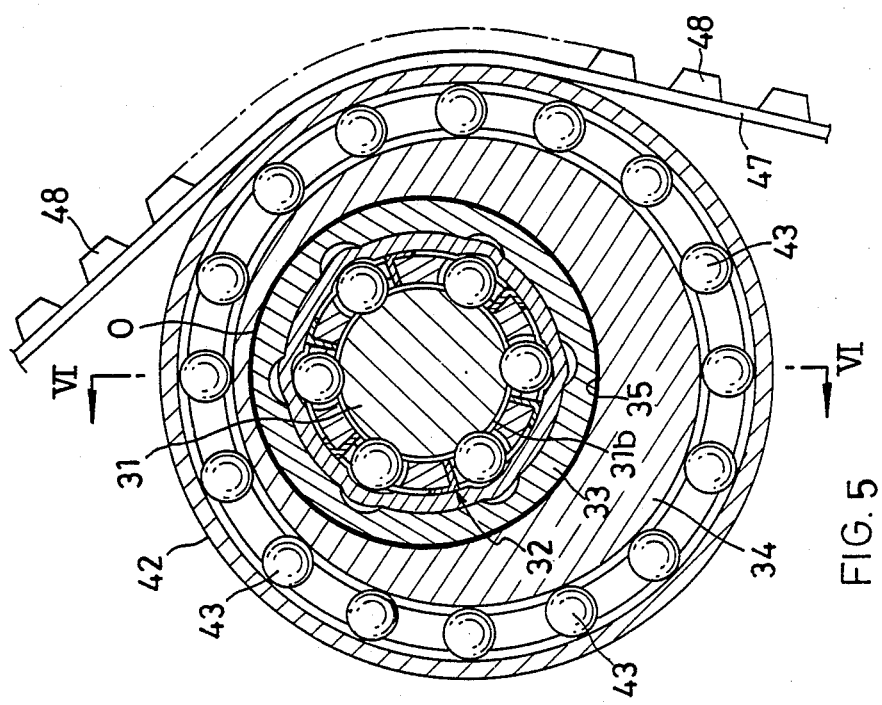
FIG. 6
FIG. 5

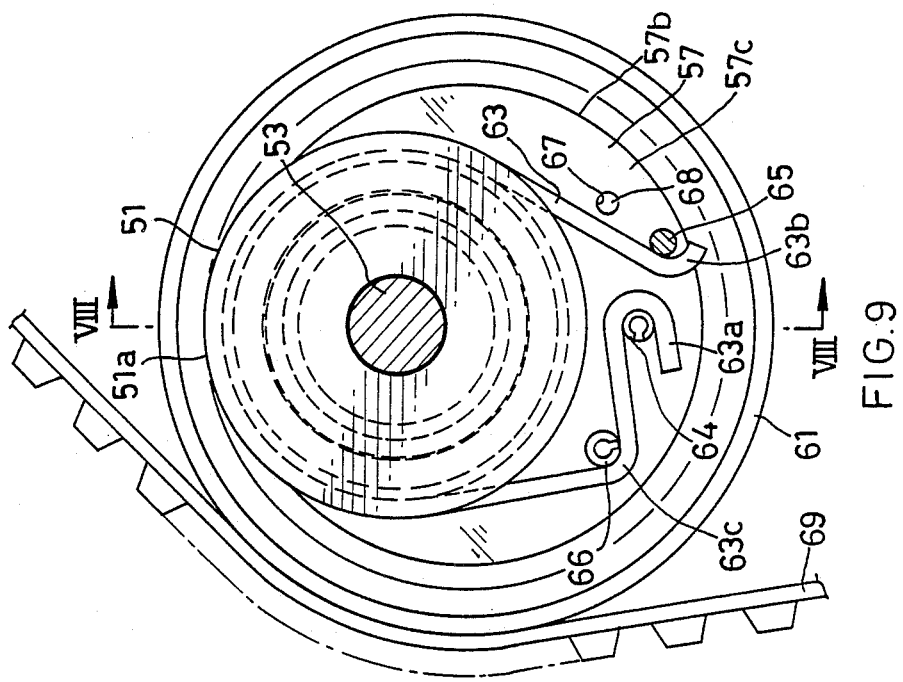
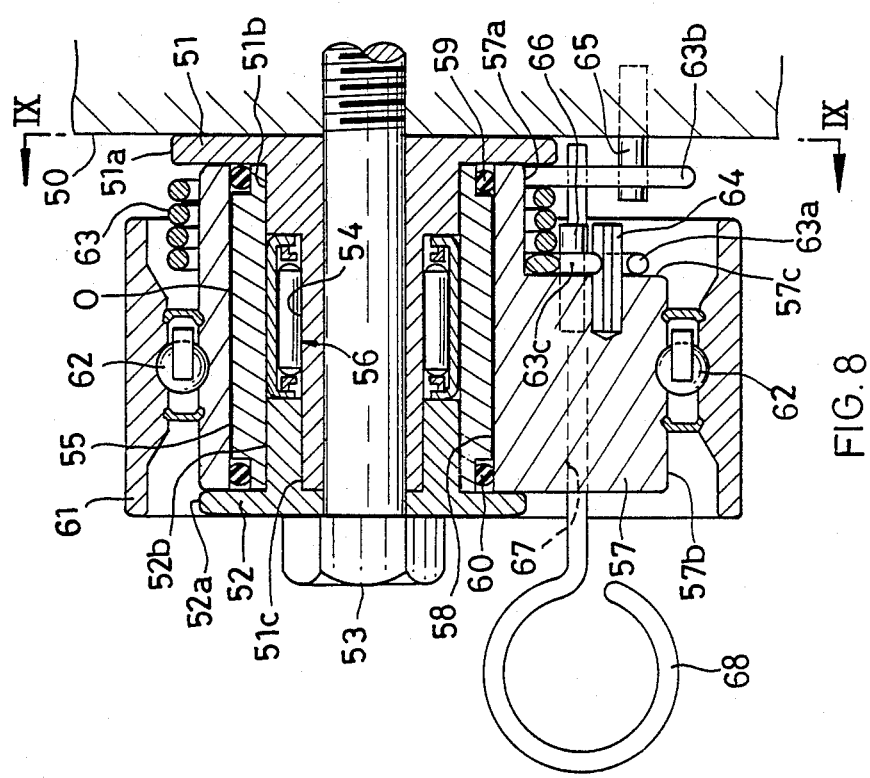

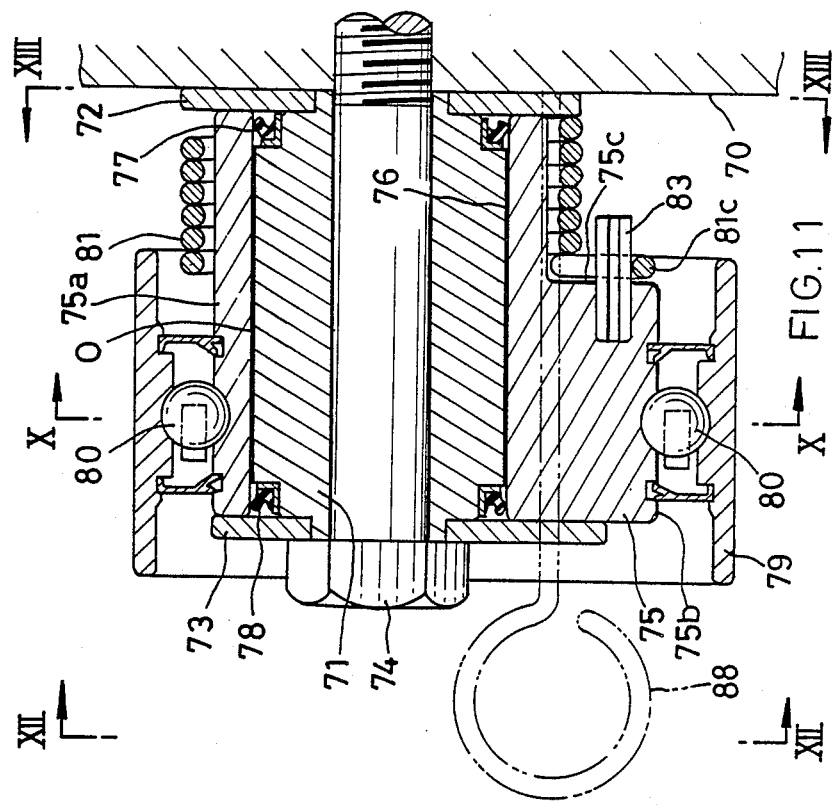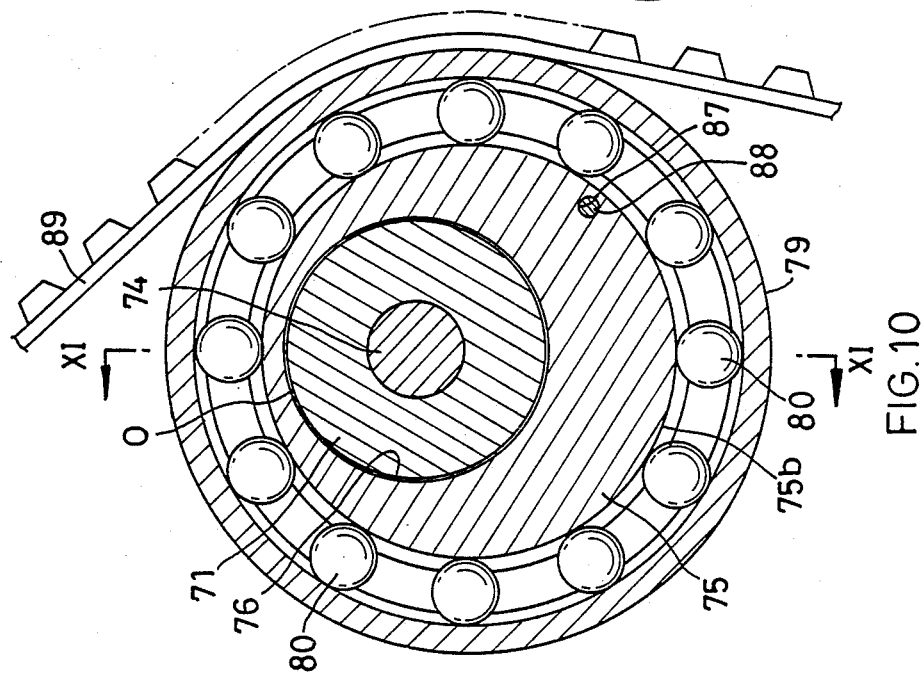

TENSIONER

BACKGROUND OF THE INVENTION

The present invention relates to a tensioner for wrapping connector driving members, such as belts and chains, and more particularly to a tensioner for giving specified tension, for example, to a timing belt reeved around a pulley on the crankshaft of a motor vehicle engine and a pulley on the camshaft thereof.

The timing belt is provided with a tensioner including an idler which is pressed against the belt as by the force of a spring to give a specified tensioning force to the belt by absorbing the stretch of the belt due to changes in the temperature of the engine or the elongation of the belt due to use.

Such belt tensioners heretofore known include one which comprises a pivot fixed to an engine or like fixed portion, and an arm rotatably supported on the pivot, having an idler rotatably mounted on its forward end and biased by a spring in a direction to press the idler against the belt (U.S. Pat. No. 4,601,683).

However, the conventional belt tensioner is relatively large-sized, requires a large space for installation and is cumbersome to handle because the idler is mounted on the forward end of the arm which is movable about the pivot.

Such belt tensioners are provided with a hydraulic damper for suppressing the resonance of the idler due to the vibration of the belt or of the engine. Nevertheless, the belt tensioner equipped with the hydraulic damper permits leakage of the oil, must therefore be replenished with oil and is cumbersome to maintain. Moreover, the hydraulic damper is complex in construction and expensive.

SUMMARY OF THE INVENTION

The main object of the present invention is to provide a tensioner for a belt, chain or the like which is simple in construction and inexpensive, can be compacted, and is therefore easy to handle and can be installed in a reduced space.

The tensioner of the present invention comprises a solid cylindrical fixed member to be fixedly attached to a stationary portion, a movable eccentric member in the form of a solid cylinder and eccentrically rotatably provided around the fixed member, an idler in the form of a hollow cylinder and rotatably provided around the movable eccentric member for contact with a wrapping connector driving member, and a spring provided between the stationary portion and the movable eccentric member for biasing the eccentric member in a direction to press the idler into contact with the wrapping connector driving member, a high-viscosity oil being provided in a clearance between the outer periphery of the fixed member and the inner periphery of the movable eccentric member.

The tensioner of the present invention can be compacted in its entirety, is easy to handle and can be installed in a small space because the movable eccentric member and the idler are provided around the fixed member and further because the high-viscosity oil provided between the fixed member and the eccentric member serves a dampening function. The high-viscosity oil, acting to diminish vibration with its viscous resistance, permits the tensioner to exhibit stable performance over a prolonged period of time, whereas the construction wherein the oil is provided merely in the clearance defined by the outer periphery of the fixed member and the inner periphery of the eccentric member is simple, inexpensive and free of oil leakage, consequently assuring facilitated maintenance.

BRIEF DESCRIPTION OF THE DRAWINGS

FIG. 1 is a view in cross section taken along the line I—I in FIG. 2 and showing a belt tensioner as a first embodiment of the invention;

FIG. 2 is a view in longitudinal section taken along the line II—II in FIG. 1;

FIG. 3 is a view of the embodiment as it is seen in the direction of arrows III—III in FIG. 2;

FIG. 4 is a view in cross section taken along the line IV—IV in FIG. 2;

FIG. 5 is a view in cross section taken along the line V—V in FIG. 6 and showing another belt tensioner as a second embodiment of the invention;

FIG. 6 is a view in longitudinal section taken along the line VI—VI in FIG. 5;

FIG. 8 is a view in longitudinal section taken along the line VIII—VIII in FIG. 9 and showing another belt tensioner as a third embodiment of the invention;

FIG. 9 is a view in cross section taken along the line IX—IX in FIG. 8;

FIG. 10 is a view in cross section taken along the line X—X in FIG. 11 and showing another belt tensioner as a fourth embodiment of the invention;

FIG. 11 is a view in longitudinal section taken along the line XI—XI in FIG. 10;

DESCRIPTION OF THE PREFERRED EMBODIMENTS

Figure 7:
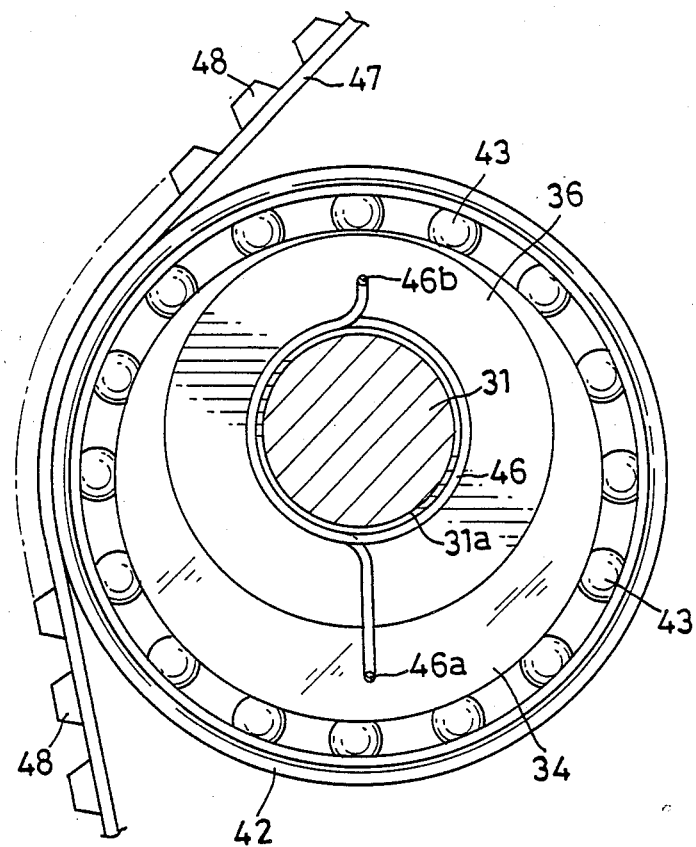
FIG. 7 is a view in cross section taken along the line VII—VII in FIG. 6.
Figure 13:
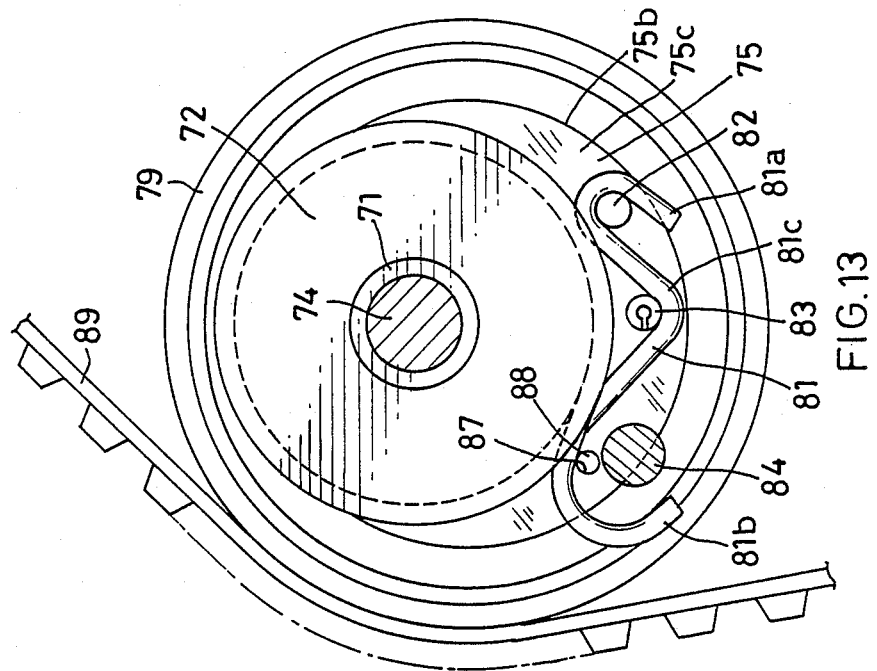
FIG. 13 is a view in cross section taken along the line XIII—XIII in FIG. 11.
Figure 12:
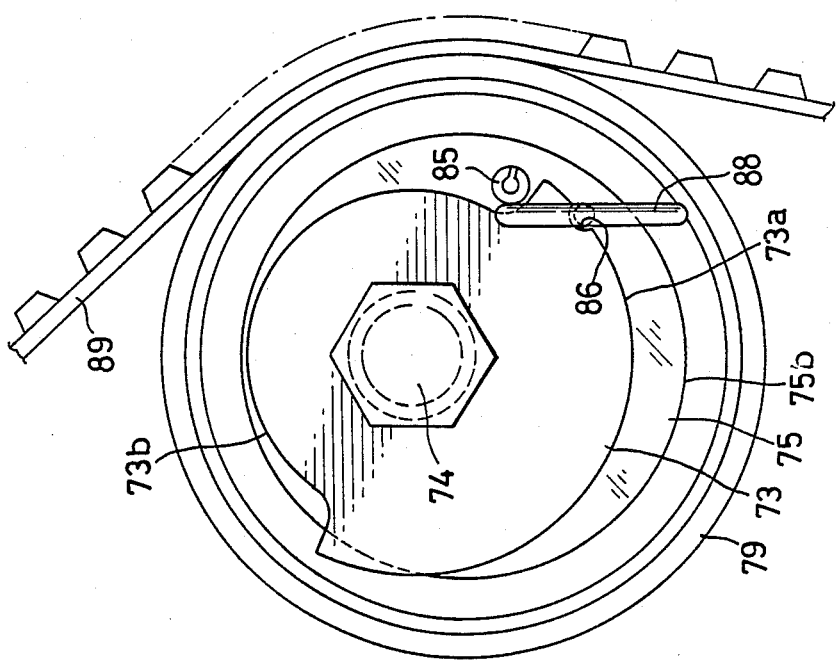
FIG. 12 is a view of the tensioner as it is seen in the direction of arrows XII—XII in FIG. 11.

With reference to the accompanying drawings, the present invention will be described below as it is embodied for the timing belt for motor vehicle engines.

FIGS. 1 to 4 show a first embodiment.

The belt tensioner of the first embodiment is secured to a stationary portion (e.g. the cylinder block) 11 of an engine by a fixed rod 10 in the form of a bolt.

The fixed rod 10 has at its one end a screw portion 10b slightly smaller than an intermediate solid cylinder portion 10a thereof in outside diameter and is formed with a flange 10c and a head 10d integrally with the other end thereof. A side plate 12 in the form of an annular disk and having substantially the same outside diameter as the flange 10c is press-fitted to the screw portion 10b of the fixed rod 10. The fixed rod 10 is secured to the stationary portion 11 with the screw portion 10b screwed into the portion 11, whereby the side plate 12 is clamped between the rod cylinder portion 10a and the stationary portion 11.

A hollow cylindrical intermediate member 13, slightly shorter than the cylinder portion 10a and having a smaller outside diameter than the flange 10c and the side plate 12, is provided around the solid cylinder portion 10a concentrically therewith, with a one-way clutch 14 interposed between the cylinder portion 10a and member 13. The intermediate member 13 has at its one portion toward the flange 10c an inside diameter slightly larger than the outside diameter of the cylinder portion 10a of the fixed rod 10. The other portion of the member 13 has an inside diameter larger than this inside diameter. Adjacent to the side plate 12, a sleeve 15 is inserted in the intermediate member 13 around the cylinder portion 10a. At the middle of the rod cylinder portion 10a, the one-way clutch 14 is disposed in an annular space between the cylinder portion 10a and the intermediate member 13. The one-way clutch 14, which is for example a known one-way roller clutch, is disengaged when intermediate member 13 rotates counterclockwise in FIG. 1 relative to the fixed rod 10, permitting the counterclockwise rotation, but is engaged when the member 13 rotates clockwise in FIG. 1 to lock the member 13.

A movable eccentric member 16 in the form of a short cylinder having the same length as the intermediate member 13 is eccentrically rotatably provided around the intermediate member 13. The eccentric member 16 has an eccentric bore 17 having the member 13 fitted therein. The clearance between the outer periphery of the intermediate member 13 and the bore defining inner periphery of the eccentric member 16 is minimized. Silicone oil O, for example at least 100,000 cst. (25° C.) in viscosity, is provided in the clearance to give an increased rotational torque to the eccentric member 16. The rotational torque, which is dependent on the viscosity of the oil O, is determined also according to the outside diameter and length of the intermediate member 13 and to the size of the clearance between the member 13 and the eccentric member 16. O-rings 18 and 19 are interposed between these members 13 and 16 at their respective ends for confining the oil in the clearance.

A hollow cylindrical idler 20 provided around the eccentric member 16 with a plurality of spherical rolling members 21 interposed therebetween is rotatable but is almost prevented from moving in the axial direction.

The eccentric member 16 has adjacent to the side plate 12 a boss portion 16a substantially concentric with the fixed rod 10. A coiled torsion spring 22 is provided around the boss portion 16a and has one end 22a engaged with a pin 23 fixed to a stepped portion 16c of the eccentric member 16 which portion 16c is provided between the boss portion and an accentric portion 16b of the member 16. The other end 22b of the spring is engaged with a pin 24 fixed to the stationary portion 11. The spring 22 biases the eccentric member 16 counterclockwise in FIG. 1, pressing the idler 20 against one side of a timing belt 25 opposite to the other side thereof having teeth 26.

The eccentric portion 16b of the eccentric member 16 is formed with a pin insertion bore 27 extending therethrough axially. Before the belt tensioner is attached to the engine, a set pin 28 is inserted into the bore 27 from the flange (10c) side. The set pin 28, projecting from the stepped portion 16c of the member 16, is positioned outside the boss portion 16a, and the end 22b of the spring 22 to be engaged with the pin 24 on the stationary portion 11 is in engagement with the set pin 28. The spring 22 in this state has its force set to a suitable value.

After the fixed rod 10 and the side plate 12 have been secured to the stationary portion 11 in this state as shown in FIG. 2, the set pin 28 is removed from the eccentric member 16. The spring end 22b is engaged with the pin 24 on the stationary portion 11, whereby the belt tensioner can be installed in place easily.

If the belt 25 abruptly slacks, for example, owing to quick acceleration of the engine, the eccentric member 16 is forced into counterclockwise rotation in FIG. 1 by the action of the spring 22, with the intermediate member 13 also acting to rotate in the same direction by virtue of the viscous resistance of the oil O. Since the one-way clutch 14 is disengaged, permitting the rotation of the intermediate member 13 in this direction, the eccentric member 16 rapidly rotates with the intermediate member 13 in the counterclockwise direction in FIG. 1, causing the idler 20 to quickly follow the slacking of the belt 25 to be pressed against the belt, which in turn is held under tension as specified. This eliminates the likelihood that some teeth on the belt 25 will fail to engage the member concerned. Conversely, when the tension builds up owing to the contraction of the belt 25, the eccentric member 16 acts to rotate clockwise in FIG. 1 against the force of the spring 22, and the intermediate member 13 also acts to rotate in the same direction owing to the viscous resistance of the oil O. However, the one-way clutch 14 engages to prevent the rotation of the intermediate member 13 in this direction, so that the eccentric member 16 only gently rotates clockwise in FIG. 1 against the viscous resistance of the oil O, slowly shifting the idler 20 until the tension on the belt 25 lowers to the specified value. The vibration of the idler 20 due to the vibration of the belt 25 and the vibration of the engine is diminished by the viscous resistance of the silicone oil O acting against the rotation.

Thus, the viscous resistance of the silicone oil exhibits a dampening effect, assuring the tensioner of stable performance over a prolonged period of time without the need of oil replenishment. The tensioner is very simple and compact in construction and inexpensive, and can be installed in a small space.

The silicone oil O can be provided in the clearance between the intermediate member 13 and the eccentric member 16 by applying the oil to one or both of the outer periphery of the intermediate member 13 and the inner periphery of the eccentric member 16 and thereafter fitting these members to each other. The silicone oil can be spread throughout the entire clearance easily also by forming a helical small groove or axial small grooves in the outer periphery of the intermediate member 13 or in the bore defining inner periphery of the eccentric member 16, placing the oil into the groove(s) and thereafter rotating the eccentric member 16 as fitted around the intermediate member 13. It is also possible to cause the outer periphery of the intermediate member 13 or the inner periphery of the eccentric member 16 to retain the silicone oil in an annular groove formed therein.

In the case of the above belt tensioner, the screw portion 10b of the fixed rod 10 is right-handed, and the direction in which the screw portion 10b is tightened up agrees with the direction (clockwise in FIG. 1) of rotation of the eccentric member 16 when the tension on the belt 25 builds up. Consequently, when the belt tension increases, the one-way clutch 14 engages as already stated, subjecting the fixed rod 10 to a torque acting to further tightening the rod. Conversely, when the tension on the belt 25 diminishes, the one-way clutch 14 is disengaged, rendering the rod 10 free of the torque acting to loosen the rod. Thus, there is no likelihood that the fixed rod 10 will loosen during use. Further because the clutch 14 is engaged by rotating the eccentric member 16 and the intermediate member 13 in the direction to tighten the fixed rod 10 while the rod 10 is held in fixed state, the clutch 14 is disengaged by rotating the fixed rod 10 in the tightening direction, with the eccentric member 16 and the intermediate member 13 held in fixed state. Accordingly, the tensioner can be installed in place easily by rotating the fixed rod 10 only in the tightening direction.

FIGS. 5 to 7 show a second embodiment.

A stepped fixed rod 31 is secured at its base end 31a to a stationary portion 30 of an engine. A hollow cylindrical intermediate member 33 is provided around an intermediate solid cylinder portion 31b of the fixed rod 31, with a one-way clutch 32 interposed therebetween. Like the clutch 14 of the first embodiment, the clutch 32 permits the intermediate member 33 to rotate counterclockwise in FIG. 5 relative to the fixed rod 31 but prevents clockwise rotation in FIG. 5 of the member 33. An eccentric member 34 in the form of a short cylinder is eccentrically rotatably provided around the intermediate member 33. The member 33 is fitted in an eccentric bore 35 in the eccentric member 34. As in the case of the first embodiment, silicone oil O is provided in a clearance between the outer periphery of the intermediate member 33 and the inner periphery defining the eccentric bore 35 of the member 34. Side plates 36 and 37 each in the form of an annular disk are secured to the respective end faces of the intermediate member 33 concentrically therewith. The side plates 36, 37 have an inside diameter slightly larger than the outside diameter of the intermediate cylinder portion 31b of the rod 31 and are greater than the intermediate member 33 in outside diameter. The eccentric member 34 is equal to the intermediate member 33 in length. The opposite end face portions of the eccentric member 34 close to its inner periphery are in contact with the inner surface portions of the respective side plates 36, 37 close to their outer peripheries. O-rings 38, 39, 40, 41 for confining the oil O are fitted in the opposite end faces of the intermediate member 33 and of the eccentric member 34, in pressing contact with the side plates 36, 37. As in the case of the first embodiment, a hollow cylindrical idler 42 is provided around the eccentric member 34, with a plurality of spherical rolling members 43 interposed therebetween. The idler 42 is rotatable but is almost prevented from axial movement. A collar 44 is fitted to a stepped portion between the intermediate cylinder portion 31b of the rod 31 and a screw portion 31c thereof at its top end and is fastened by a nut 45 screwed on the screw portion 31c. The side plates 36, 37 are held at their inner peripheral portions between the collar 44 and a stepped portion between the cylinder portion 31b of the rod 31 and the base end 31a thereof, whereby the overall assembly is held almost immovable axially thereof. A coiled torsion spring 46 is fitted around the base end portion 31a of the fixed rod 31 and has its opposite ends 46a, 46b anchored in the eccentric member 34 and the stationary portion 30, respectively. The spring 46 biases the eccentric member 34 counterclockwise in FIG. 5, pressing the idler 42 against one side of a timing belt 47 opposite to the other side thereof having teeth 48.

The belt tensioner of the second embodiment operates in the same manner as the first.

FIGS. 8 and 9 show a third embodiment.

Two fixed members 51, 52, each in the form of a stepped cylinder, are concentrically secured to a stationary portion 50 of an engine by a fixed rod 53 in the form of a bolt. The first of the fixed members, 51, has a flange 51a at one end thereof adjacent to the stationary portion 50, and a small-diameter portion 51c toward the other end thereof. Between the flange 51a and the small-diameter portion 51c, the fixed member 51 has an intermediate member support portion 51b having an intermediate outside diameter between the outside diameters of the flange and the portion 51c. The small-diameter portion 51c extends toward the head end of the fixed rod 53 and is fitted in the second fixed member 52. The second fixed member 52 has a flange 52a at one end thereof adjacent to the head end of the fixed rod 53. The remaining portion of the member 52 serves as an intermediate member support portion 52b having the same diameter as the support portion 51b of the first fixed member 51. Formed around the small-diameter portion 51c of the first fixed member 51 is an annular groove 54 between the support portions 51b, 52b of the two fixed members 51, 52. An intermediate member 55 in the form of a hollow cylinder having a smaller outside diameter than the flanges 51a, 52a is provided around the support portions 51b, 52b concentrically therewith. As is the case with the first embodiment, one-way clutch 56 is disposed in the annular groove 54 for permitting the intermediate member 55 to rotate clockwise in FIG. 9 relative to the fixed members 51, 52 but preventing the rotation thereof in the opposite direction. A movable eccentric member 57 in the form of a short cylinder is eccentrically rotatably fitted around the intermediate member 55. Silicone oil O is provided in a clearance between the outer periphery of the intermediate member 55 and the inner periphery of the eccentric member 57 defining its eccentric bore 58. O-rings 59, 60 for confining the oil O are interposed between the intermediate member 55 and the eccentric member 57 at their opposite ends. A hollow cylindrical idler 61 is provided around the eccentric member 57 with a plurality of spherical rolling members 62 interposed therebetween. The eccentric member 57 has, at one end thereof close to the stationary portion 50, a boss portion 57a carrying a coiled torsion spring 63 therearound. The spring 63 has one end 63a in engagement with a first pin 64 anchored in a stepped portion 57c of the eccentric member 57 and the other end 63b engaged with a pin 65 fixed in the stationary portion 50. The spring 63 is bent at a portion thereof close to the end 63a, and the bent portion 63c is engaged with a second pin 66 anchored in the stepped portion 57c of the eccentric member 57, on one side of the pin 66 opposite to the side where the end 63a is engaged with the first pin 64, the second pin 66 thus being adapted to bear the reaction to be exerted by the first pin 64. The spring 63 biases the eccentric member 57 clockwise in FIG. 9 to press the idler 61 against a timing belt 69.

In the absence of the second pin 66, the reaction from the first pin would press the spring 63 against the boss portion 57a of the eccentric member 57, possibly impeding smooth rotation of the eccentric member 57, whereas in the case of the present embodiment, the second pin 66 bears the reaction from the first pin 64, obviating the likelihood that the spring 63 will be pressed against the boss portion 57a and consequently assuring the eccentric member 57 of smooth rotation.

Before the belt tensioner is attached to the engine, a set pin 68 is inserted through a bore 67 through the eccentric portion 57b of the eccentric member 57, and the spring end 63b to be engaged with the pin 65 on the stationary portion 50 is engaged with the set pin 68 as in the first embodiment.

The belt tensioner of the third embodiment is assembled and operates in the same manner as in the case of the first embodiment.

With the foregoing three embodiments, the intermediate member is provided around the fixed rod with one-way interposed therebetween, and the movable eccentric member is fitted around the intermediate member with silicone oil provided therebetween. Alternatively, the movable eccentric member may be fitted around the fixed rod or a cylindrical member fixedly provided around the fixed rod, with silicone oil provided on the inner periphery of the eccentric member.

FIGS. 10 to 13 show such an embodiment, i.e. a fourth embodiment.

A solid cylindrical fixed member 71 and side plates 72, 73 attached to the respective ends of the member 71 and each in the form of an annular disk are concentrically secured to a stationary portion 70 of an engine by a fixed rod 74 in the form of a bolt. A movable eccentric member 75 in the form of a short cylinder is eccentrically rotatably fitted around the fixed member 71. Silicone oil O is provided in a clearance between the outer periphery of the fixed member 71 and the inner surface of the eccentric member 75 defining an eccentric bore 76. Seals 77, 78 for confining the oil O is provided between the fixed member 71 and the eccentric member 75 at their respective opposite ends. A hollow cylindrical idler 79 is provided around the eccentric member 75, with a plurality of spherical rolling members 80 disposed therebetween. The eccentric member 75 has a boss portion 75a closer to the stationary portion 70 and carrying a coiled torsion spring 81 therearound. The spring 81 has one end 81a engaged with a first pin 82 anchored in a stepped portion 75c of the eccentric member 75, a bent portion 81c close to the end 81a and engaged with a second pin 83 fixed to the stepped portion 75c, and the other end 81b engaged with a pin 84 fixed in the stationary portion 70. The spring 81 biases the eccentric member 75 counterclockwise in FIG. 10, pressing the idler 79 against a timing belt 89.

The side plate 73 adjacent to the head end of the fixed rod 74 has a large-diameter portion 73a over about one-half of its circumference and a small-diameter portion 73b corresponding to the remaining approximate one-half of the circumference. A restricting pin 85 is fixed to the end face of an eccentric portion 75b of the member 75 and is positioned outwardly of the small-diameter portion 73b but inwardly of the large-diameter portion 73a. The range of rotation of the eccentric member 75 is restricted by the contact of the pin 85 with the large-diameter portion 73a. A semicircular cutout 86 is formed in the outer peripheral edge of the large-diameter portion 73a of the side plate 73, while a pin insertion bore 87 corresponding to the cutout 86 extends through the eccentric portion 75b of the member 75.

Before the belt tensioner is attached to the engine, a set pin 88 is fitted in the cutout 86 of the side plate 73 and inserted through the bore 87 of the eccentric member 75, and the end 81b of the spring 81 to be engaged with the pin 84 on the stationary portion 70 is engaged with the set pin 88.

The belt tensioner of the fourth embodiment is similar to the third embodiment in its assembling procedure and operation except that it has no one-way clutch.

The tensioners of the invention are of course usable for belts and chains other than the timing belts for motor vehicle engines.

What is claimed is:

1. A tensioner comprising a cylindrical first member to be fixedly attached to a stationary portion and having an outer periphery, a movable member having an inner periphery rotatably supported on said outer periphery of said first member, an idler in the form of a hollow cylinder eccentrically attached by said movable member to said first member for rotatable contact with a wrapping connector driving member, a spring provided between the stationary portion and the movable member for biasing the movable member in a direction to press the idler into contact with the wrapping connector driving member, and a high-viscosity oil provided in a clearance between the inner periphery of the movable member and that portion of the outer periphery of the first member which rotatably supports the inner periphery of said movable member.

2. A tensioner as defined in claim 1 wherein the member is an intermediate member provided around a fixed rod with a one-way clutch interposed therebetween, the fixed rod being secured to the stationary portion, the movable member being provided around the intermediate member, the one-way clutch permitting the intermediate member to rotate in a direction to press the idler against the wrapping connector driving member but prevents the intermediate member from rotating in a direction to move the idler away from the wrapping connector driving member.

3. A tensioner as defined in claim 2 wherein the fixed rod is screwed into the stationary portion, the direction of rotation of the movable member being in agreement with the direction in which the fixed rod is tightened up when the tension on the wrapping connector driving member builds up, the movable member being adapted to exert a fixed rod tightening torque on the fixed rod through the one-way clutch when the tension on the wrapping connector driving member builds up.

4. A tensioner as defined in claims 2 or 1 wherein the spring is a coiled torsion spring provided around the first member and having one end attached to the movable member and the other end attachable to the stationary portion, the movable member being formed with a bore for inserting therethrough a set pin for engaging said other end of the spring.

* * * * *